US006590196B2

(12) United States Patent
Lauxtermann

(10) Patent No.: US 6,590,196 B2
(45) Date of Patent: Jul. 8, 2003

(54) MATRIX PHOTOSENSOR IN WHICH EACH PIXEL INCLUDES ONLY TWO TRANSISTORS

(75) Inventor: Stefan Lauxtermann, Berikon (CH)

(73) Assignee: CSEM Centre Suisse d'Electronique et de Microtechnique S.A., Neuchatel (CH)

( * ) Notice: Subject to any disclaimer, the term of this patent is extended or adjusted under 35 U.S.C. 154(b) by 0 days.

(21) Appl. No.: 09/882,281

(22) Filed: Jun. 15, 2001

(65) Prior Publication Data

US 2002/0005473 A1 Jan. 17, 2002

(30) Foreign Application Priority Data

Jun. 16, 2000 (FR) .............................................. 00 07677

(51) Int. Cl.⁷ .............................................. H01L 27/00
(52) U.S. Cl. .................................... 250/208.1; 348/311
(58) Field of Search ........................... 250/208.1, 208.2, 250/214.1; 348/302, 298, 300, 301, 311

(56) References Cited

U.S. PATENT DOCUMENTS 6,097,022 A  * 8/2000  Merrill et al. ............ 250/208.1
6,133,563 A  * 10/2000 Clark et al. ............... 250/208.1
6,239,839 B1 * 5/2001  Matsunaga et al. ......... 348/308
6,252,215 B1 * 6/2001  Mei et al. ................. 250/208.1
6,369,853 B1 * 4/2002  Merrill et al. ............. 348/302
6,380,530 B1 * 4/2002  Afghahi .................... 250/208.1

FOREIGN PATENT DOCUMENTS

EP        0865197      9/1998

* cited by examiner

*Primary Examiner*—Stephone B. Allen
*Assistant Examiner*—Christopher W. Glass
(74) *Attorney, Agent, or Firm*—Jacobson Holman PLLC

(57) ABSTRACT

An integrated active pixel photosensor includes a matrix array of pixels. Each pixel includes a photosensitive component, an amplifier component and a reset to initial state component. The matrix array further includes, for controlling the pixels, an addressing device, a power supply device, a reset to initial state device and a device for reading luminance information picked up by the pixels to extract the information from the matrix array. The addressing, power supply, reset and reading devices are implemented by the same plurality of matrix array column and row lines. The photosensor further includes logic control devices external to the matrix array and connected to the column and row lines to enable selective control in each pixel of the power supply, addressing, return to initial state and read functions.

2 Claims, 2 Drawing Sheets

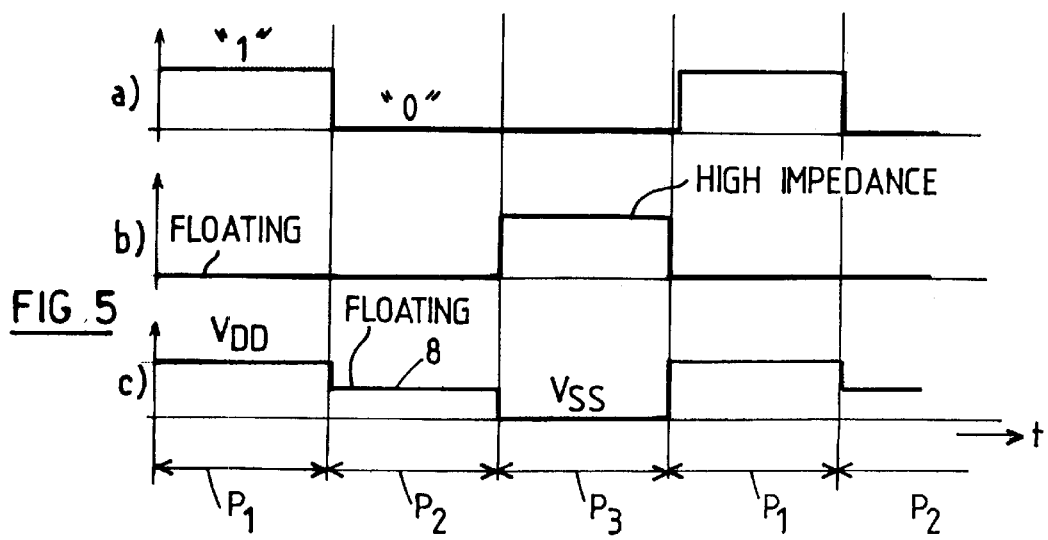
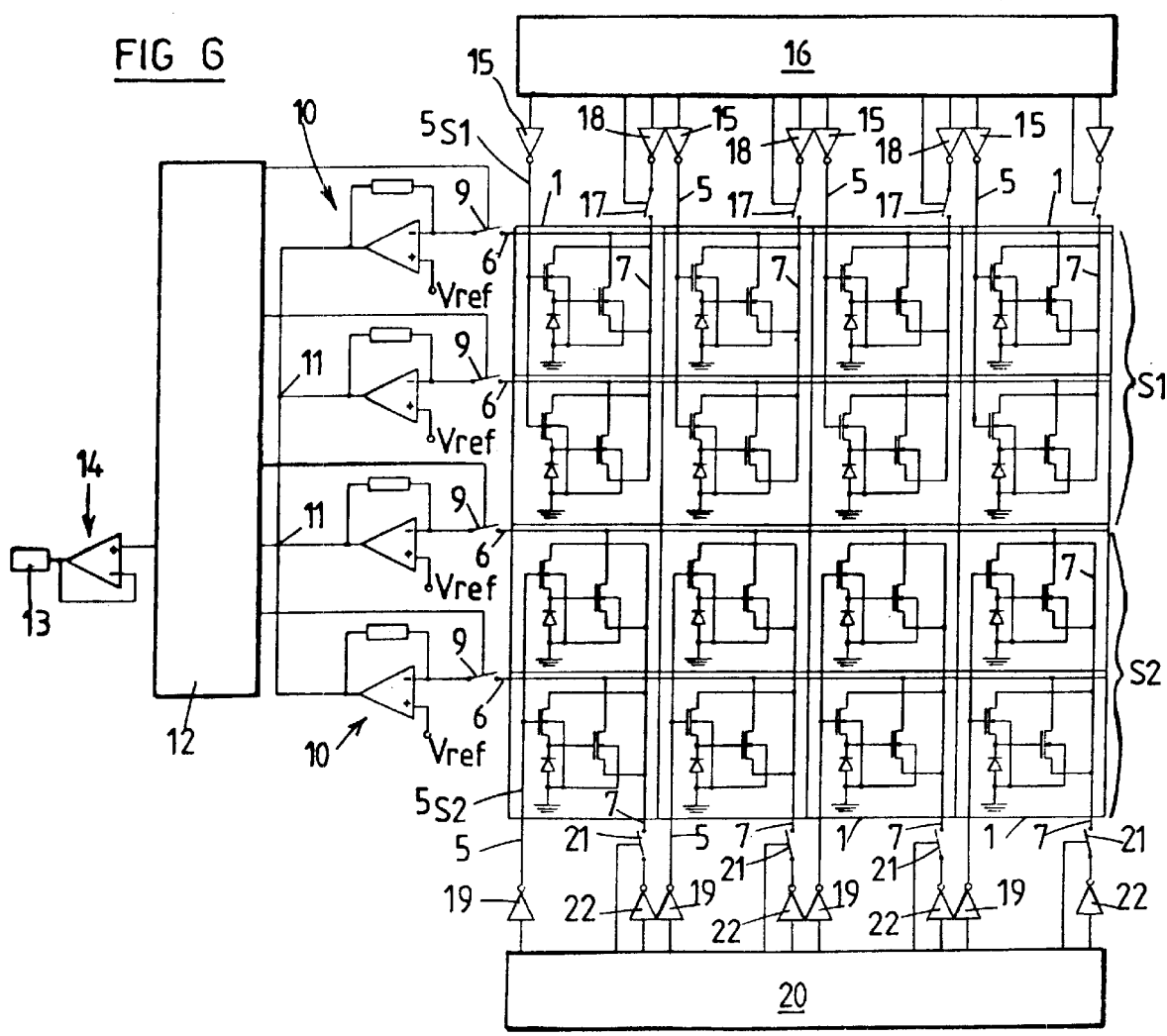

MATRIX PHOTOSENSOR IN WHICH EACH PIXEL INCLUDES ONLY TWO TRANSISTORS

BACKGROUND OF THE INVENTION

1. Field of the Invention

The present invention relates to an integrated active pixel photosensor including a matrix array of pixels, each pixel including a photosensitive component, an amplifier component and a reset to initial state component, and the matrix array further including, for controlling the pixels, an addressing device, a power supply device, a reset to initial state device and a device for reading luminance information picked up by the pixels to extract the information from the matrix array.

2. Description of the Prior Art

In this kind of photosensor only part of the total surface area of the chip on which it is implemented is sensitive to light, the remainder of the surface being occupied by components and conductors. This is why the "filling factor" of these arrays is relatively low.

In one prior art photosensor each pixel comprises three active components, such as transistors, respectively implementing the functions of amplification, addressing and resetting to the initial state (hereinafter RIS). The matrix array requires four types of conductor connected to the cells for implementing the functions of power supply, information output, read control and RIS control. If the photosensor uses the 1 $\mu$m CMOS technology, a pixel of the array will have a filling factor of only 40% and a surface area of 15×15 $\mu m^2$.

The proposal of Hisanori Ihara et al. submitted to the IEEE International Conference on Solid State Circuits, 1998, session 11, document FA 11.8, relates to a matrix photosensor array pixel comprising only two transistors, one for amplification and the other for RIS, but the pixel further includes an addressing capacitor specially integrated on the chip alongside the active components.

The addressing capacitor is a disadvantage which, compared to the prior art briefly referred to above, further penalizes the filling factor, as it requires additional surface area. Also, the RIS select line of the circuit must carry very similar analog potentials (typically 0.9 V and 2.1 V) during the respective phases of integration (acquisition of the luminance signal) and pixel reading. It is difficult to fix these close potentials, especially as this must be done in a very short time period.

An object of the invention is to provide an integrated photosensor of the type defined above which is free of the disadvantages of the prior art discussed above.

SUMMARY OF THE INVENTION

The invention therefore provides an integrated active pixel photosensor including a matrix array of pixels, each pixel including a photosensitive component, an amplifier component and a reset to initial state component, and the matrix array further including, for controlling the pixels, an addressing device, a power supply device, a reset to initial state device and a device for reading luminance information picked up by the pixels to extract the information from the matrix array, in which photosensor the addressing, power supply, reset and reading devices are implemented by the same plurality of matrix array column and row lines and the photosensor further includes logic control devices external to the matrix array and connected to the column and row lines to enable selective control in each pixel of the power supply, addressing, return to initial state and read functions.

Accordingly, each pixel of the matrix array can be implemented using only two active components, and it is not necessary to use any specially integrated capacitor. Also, the circuit in accordance with the invention requires a very small number of connecting lines. The filling factor of the matrix array can therefore be significantly greater than in the prior art.

Other features and advantages of the present invention will become apparent in the course of the following description, which is given by way of example only and with reference to the accompanying drawings.

BRIEF DESCRIPTION OF THE DRAWINGS

FIG. 5 is a timing diagram of those three phases of operation.

FIG. 6 is a diagram of one embodiment of a photosensor according to the invention.

DETAILED DESCRIPTION OF THE PREFERRED EMBODIMENT

Figure 1:
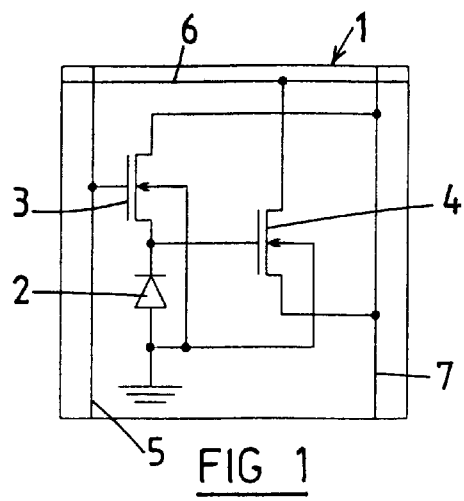
FIG. 1 is a diagram of one embodiment of a pixel of a photosensor according to the invention.

FIG. 1 shows a preferred embodiment of an active pixel 1 which is part of a matrix array of identical pixels that form a photosensor according to the invention.

The pixel 1 includes a photosensitive component 2 such as a diode with its anode grounded. Its cathode is connected to the source of an RIS transistor 3 and to the gate of an amplifier transistor 4.

The gate of the transistor 3 is connected to an RIS line 5 which runs from pixel to pixel along the corresponding column of the matrix array in which the pixel concerned is included.

The drain of the transistor 4 is connected to a "high-impedance" line 6 which extends from pixel to pixel along a row of the matrix array.

The source of the transistor 4 is connected to a "low-impedance" line 7 which is also oriented along a column of the matrix array. The drain of the transistor 3 is also connected to the same low-impedance line 7.

Figure 2:
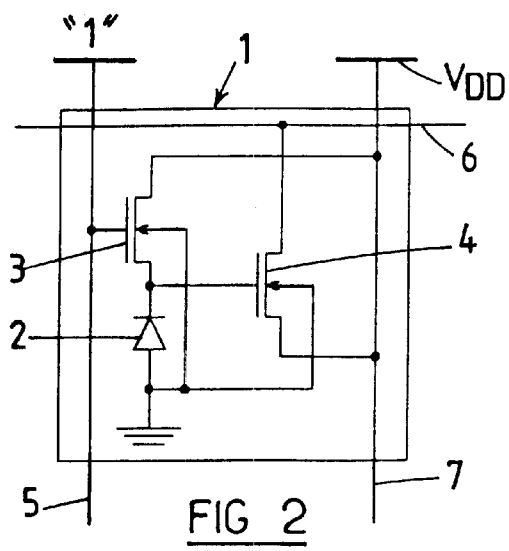
FIGS. 2 to 4 are diagrams of the same pixel and each shows one of the three phases of its operation.
Figure 3:
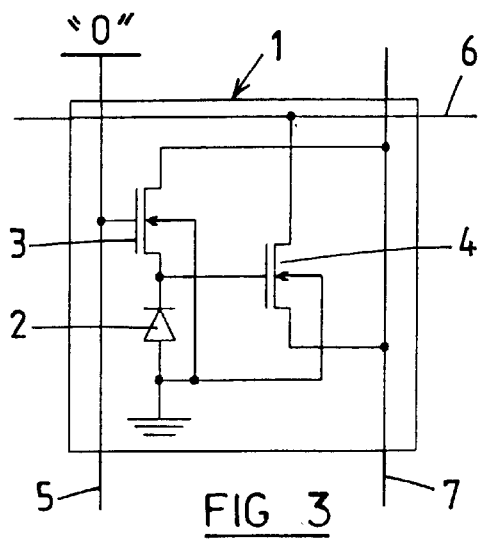
Figure 4:
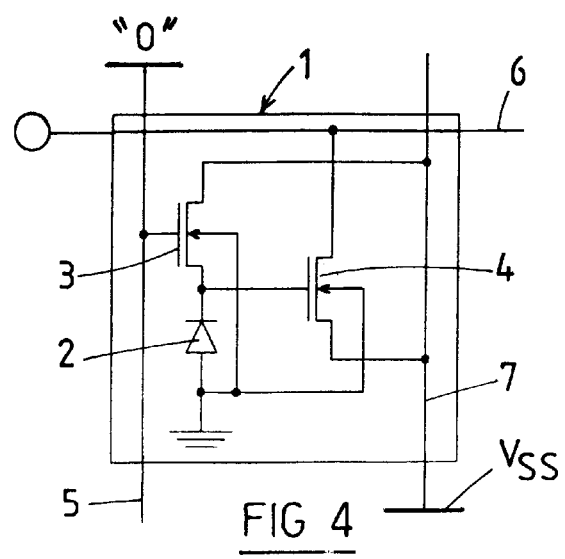

FIGS. 2, 3 and 4 show three operating configurations of the pixel just described, the three configurations respectively corresponding to a RIS phase, a phase of integration (acquisition of luminance information), and a read phase. FIG. 5 is a timing diagram showing as a function of time t, respectively at a), b) and c), the states of the lines 5, 6 and 7 during the three phases denoted P1, P2 and P3 in this figure. The diagrams do not indicate the values or the potentials on these lines, but merely their active states, in a qualitative form.

During the RIS phase (FIG. 2 and P1 in FIG. 5), the low-impedance line 7 is connected to a potential of a first polarity, such as the supply potential $V_{DD}$, and the high-impedance line 6 is floating. The RIS line 5 is at a first logic level, for example logic "1". The stray capacitance of the diode 2 is then discharged to the potential $V_{DD}$ via the RIS transistor 3.

During the integration phase (FIG. 3 and P2 in FIG. 5), the RIS line 5 is at the opposite logic level, for example logic "0", and as a result the stray capacitance of the diode 2 is charged according to the intensity of the light impinging on the pixel concerned. During this phase, the low-impedance line 6 and the high-impedance line 7 are floating. The charge integration process is symbolized by the line 8 in FIG. 5.

During the reading phase (FIG. 4 and P3 in FIG. 5), the RIS line remains at the second logic level, the line 6 conveys a current corresponding to the detected luminance information, and the line 7 is connected at one end (the bottom end in the figure) to a potential of the opposite polarity to the previous polarity, for example the supply voltage $V_{SS}$. The other end is floating.

FIG. 6 shows one example of a matrix array that can be formed of pixels as just described above. Although only 16 pixels are shown, for simplicity, it is obvious that the array can incorporate many more pixels.

Note that the array is divided into two sections S1 and S2 which respectively occupy the top half (as seen in FIG. 6) and the bottom half of the array. Each high-impedance line 6 can be connected by a switch 9 to a "transimpedance" amplifier 10 whose output is connected to a node 11. The latter node is connected to row control logic 12 which controls the switches 9. The output of the array is fed to a terminal 13 via a voltage amplifier 14.

The RIS lines 5 of the section S1 are connected via inverters 15 to control logic 16 for section S1. The low-impedance lines 7 of the same section are connected to a switch 17 connected in turn to the control logic 16 and used to connect an inverter 18 to the lines 7.

A similar control circuit for the column lines 5 and 7 is provided for the bottom section S2 of the array. It includes inverters 19, control logic 20, switches 21 and inverters 22.

The control logic 12, 16 or 20 uses the lines 5, 6 and 7 to control pixels by assigning to them connection or floating functions so that all the pixels 1 can assume in turn the three configurations just described above with reference to FIGS. 2 to 4.

The skilled person knows how to implement the control logic 12, 16 or 20 to this end.

The control logic 12, 16 or 20 is therefore capable of placing the pixels 1 in each section S1 and S2 in a read configuration (FIG. 4) sequentially, column by column. While one column of pixels 1 is being read, the high-impedance lines 6 are sequentially scanned row by row by closing the switches 9 in sequence, as commanded by the control logic 12. It is therefore possible to measure the luminance signals pixel by pixel in the two sections S1 and S2 of the array. Because the low-impedance output (line 7) of a pixel 1 is at the potential $V_{SS}$ during this measurement, the backgating effect is eliminated. It would otherwise risk reducing the transconductance of the amplifier transistor 4 of the pixel, given that the source and the well of that transistor are both at the potential $V_{SS}$ (for example grounded). However, the lines 7 of all the other columns are then floating, to prevent the pixels of those columns contributing to the current of the pixel 1 which is in the read configuration at the time concerned.

Reading the pixels must be interrupted during the RIS phase because each low-impedance line 7 has two functions: on the one hand, it must apply the potential VDD to the pixel to enable the stray capacitance of the diode 2 to discharge into it; on the other hand, it must provide the connection to the potential $V_{SS}$ so that the pixel can be read.

Because these two functions of the line 7 cannot be executed simultaneously, an advantageous feature of the invention divides the matrix array into two sections S1 and S2 so that one of the sections can be in the RIS phase at the same time as the other section is in the read phase.

Of course, the array that has just been described can be implemented with components of the opposite type of conductivity to that of the components shown in the figures.

There is claimed:

1. An integrated active pixel photosensor in which each pixel includes a photosensitive component and only two transistors, said photosensor including a matrix array of pixels, said matrix array comprising:

a plurality of pixels arranged in columns and rows, first and second pluralities of column lines respectively arranged in the said columns; a different one of each of said pluralities connected to the pixels of corresponding column, each of said pixels being associated to a first column line and a second column line, a plurality of row lines respectively arranged in said rows and connected one each to the pixels of a corresponding row, said photosensor further comprising logic control devices external to said matrix array for establishing a repetitive connection sequence for said column and row lines, said sequence including, for each pixel of said matrix array, a reset to initial state phase, a luminance information acquisition phase, and a phase of reading said luminance information, each of said pixels comprising:
a photosensitive component having a first terminal and a second terminal,
a first transistor having a gate and a source-drain path, said gate of said first transistor being connected to said first column line associated with said pixel, said source-drain path of said first transistor being connected between one of said first and second terminals of said photosensitive element and to said second column line associated to said pixel, and
a second transistor having a gate and a source-drain path, said gate of said second transistor being connected to said one of said first and second terminals, said source-drain path of said second transistor being connected between said second column line and one of said plurality of row lines belonging to the row of pixels wherein said pixel is located,
the other one of said first and second terminals of said photosensitive element being connected to a reference potential, wherein, in each pixel and in accordance with said predetermined sequence, said logic control devices:
in said reset to initial state phase, connect said first column line to a first logic level to activate said first transistor and connect said second column line to a power supply potential of a first polarity to discharge said photosensitive component, during which reset to initial state phase said one of said row lines is floating,
in said acquisition phase, connect first column lines to a second logic level opposite said first logic level to deactivate said first transistor, during which acquisition phase said second column line and said one of said row lines are floating, and
in said read phase, maintain said first column line at said second logic level, to connect said second column line to a power supply potential of a second polarity opposite said first polarity and connect said one of said row lines to a useful signal output of said matrix array.

2. The photosensor claimed in claim 1 wherein said matrix array is divided into two sections, said logic control devices placing said pixels of one of said sections in said reset to initial state phase while the other section is in said read phrase, and vice-versa, via said column and row lines.

* * * * *